Nov. 4, 1947.  M. A. CROSBY  2,429,993
WOVEN WIRE TUBE COVERED BELT
Filed March 8, 1943
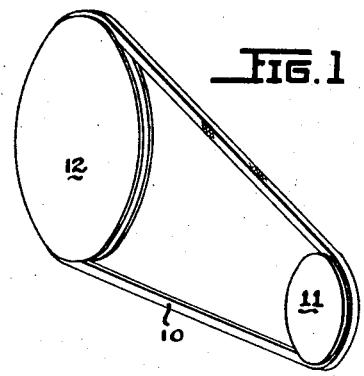
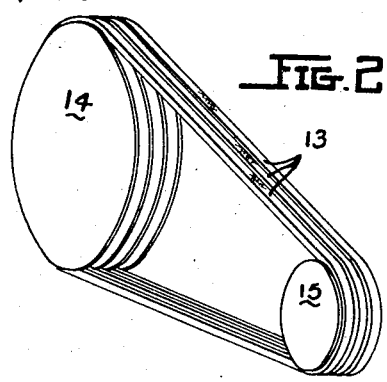
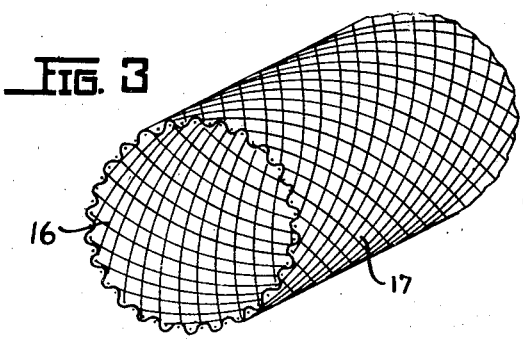
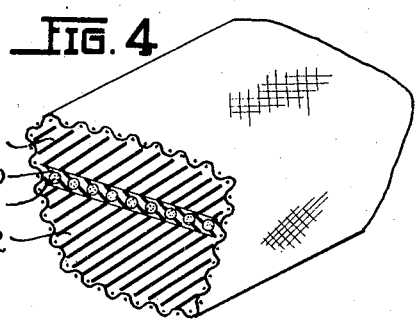
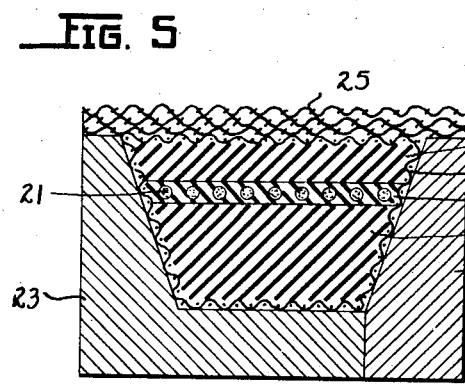
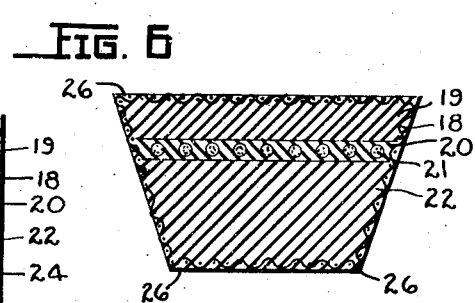
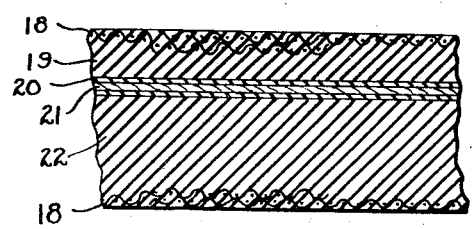
INVENTOR
MELVIN A. CROSBY
BY
Toulmin & Toulmin
ATTORNEY Patented Nov. 4, 1947

2,429,993

UNITED STATES PATENT OFFICE 2,429,993

WOVEN WIRE TUBE COVERED BELT

Melvin A. Crosby, Dayton, Ohio, assignor to The Dayton Rubber Company, a corporation of Ohio Application March 8, 1943, Serial No. 478,432

7 Claims. (Cl. 74—233)

This invention relates to belts, and more particularly deals with a belt of the V-type having a woven metal cloth wrapper adjacent its outer surfaces.

The improved belt which is the subject matter of this invention is characterized by high resistance to frictional abrasion and long service life, and may be manufactured with substantially smooth top and bottom surfaces or with alternate cogs and grooves along the inner or outer surface or along both of these surfaces.

The nature of the present invention will be fully understood from the following description taken in connection with the annexed drawing wherein:

Fig. 1 illustrates the manner in which the belt of the present invention may be used in a single belt V-drive;

Fig. 2 illustrates the manner in which the belt of the present invention may be used in a multi-belt V-drive;

Fig. 3 illustrates the woven metal cloth tube employed in the practice of the present invention;

Fig. 4 is a view of the roughly shaped body from which the belt of the present invention is produced;

Fig. 5 illustrates the manner in which the belt of the present invention is molded;

Fig. 6 is a cross sectional view of the finished belt of the present invention; and Fig. 7 is a sectional view of a portion of the belt of the present invention illustrating the manner in which the tube of Fig. 3 is spliced to obtain an endless belt.

Referring to the drawing in detail, 10 is a V-belt of the present invention driving the V-pulleys 11 and 12 in a typical single belt V-drive; and in Fig. 2, 13 represents a plurality of V-belts of the present invention driving a plurality of V-pulleys 14 and 15 in a typical multi-belt V-drive.

The belt of the present invention is manufactured by filling the hollow portion 16 of the woven metal tube 17 (see Fig. 3) with a plurality of layers adapted to comprise tension, neutral axis and compression sections in a finished belt. These layers may be introduced in the hollow portion 16 of the woven metal tube 17 by extrusion or otherwise. For example, the tube 17 may be roughly squared by pressure applied on two opposite surfaces and suitable layers of material adapted to comprise the tension, neutral axis and compression sections of a belt introduced therein in proper juxtaposition. The filled tube is then roughly shaped to the form of a V-belt (see Fig. 4) and will then comprise an outer wrapper of woven metal cloth 18, a tension layer of rubber composition 19, a neutral axis layer 20 of rubber composition including a plurality of cords 21 embedded therein and a compression layer 22. The built-up belt body thus resulting (see Fig. 4) is then placed in a suitable mold (see Fig. 5) comprising a mold half 22 and a second mold half 24. The mold halves 23 and 24 are locked in place by suitable means and a plurality of layers of wetted fabric 25 are wrapped tightly around the mold and the belt therein. The mold is then placed in a vulcanizer wherein it is subjected to heat. The drying of the wet wrappers 25 placed over the belt shrinks the layers of fabric 25 and exerts pressure on the body of the belt thus causing it to conform in shape to the general contour of the mold. The effect of the heat and pressure exerted on the belt during the vulcanizing step causes a portion of the rubber composition in the tension, neutral axis and compression sections to exude or push out through the meshes of the woven metal cloth 18 surrounding the body of the belt with the result that at the termination of the vulcanizing step (see Fig. 6) the belt has a thin layer or coating of rubber composition 26 therearound and covering the woven metal cloth wrapper 18. Therefore, the frictional engagement between the belt and the pulley is actually between the thin coating of rubber composition 26 on the surface of the belt and the metal face of the pulley and as the thin coating of rubber composition 26 is abraded away, the woven metal cloth wrapper 18 will be exposed and will come into contact with the surface of the pulley; however, a sufficient amount of rubber will remain exposed at the points between the individual strands of wire that frictional engagement between the rubber of the belt and the metal of the pulley will remain although the rate of wear will be substantially reduced due to the abrasion resistance of the metal in the woven metal cloth wrapper 18.

In Fig. 7 there is illustrated the manner in which the woven metal fabric tube 17 which eventually becomes the woven metal wrapper 18 may be spliced together by telescoping one end of the tube within the other in the event that it is desired to produce an endless belt. If the two ends of the tube are telescoped, as shown in Fig. 7, they will become permanently attached to each other through the means of the rubber composition passing through the meshes in the course of the vulcanizing operation. Of course, those skilled in the art will understand that it is not necessary to produce an endless belt in this manner nor to splice the ends of this tube in this manner. Belts of any length may be obtained with ease according to the method of the present invention by simply uniting the two ends of the finished belt by means of any suitable belt connector such as are readily obtainable in the market and are known to those skilled in the art.

It will be understood that while there has been described herein and illustrated in the drawing a tubular member of woven wire cloth, the belt of the present invention may be manufactured and substantialy the same article obtained by wrapping a plurality of superposed layers adapted to comprise tension, neutral axis and compression sections of a belt in woven metal cloth instead of inserting said layers in a tubular member of woven wire cloth as hereinbefore described.

It will be further understood that it is advantageous to have the wires in the tubular member herein described and illustrated in the drawing or in the woven metal cloth wrapper to which reference has just been made at a bias with respect to the body of the belt in order thereby to facilitate the flexing or bending of the finished belt as it passes over pulleys or sheaves of small diameter.

It will be further understood that the cords forming part of the neutral axis section may be of organic material such as cotton or rayon or of inorganic material such as glass fibers and the like.

It will be understood that while there have been illustrated in the drawing and herein described certain embodiments of the present invention, it is not intended thereby to have this invention limited to or circumscribed by the specific details of construction, arrangement of parts, procedures, or products herein described or illustrated in the drawing in view of the fact that the present invention may be modified according to individual preference and conditions without departing from the spirit of this disclosure and the scope of the appended claims.

I claim:

1. As a new article of manufacture, a rubber belt of V-shape comprising tension, neutral axis and compression sections and having a wrapper of woven metal cloth of seamless preformed sleeve construction into which said sections as a whole have been inserted and which extends around said belt.

2. As a new article of manufacture, a seamless rubber belt comprising tension, neutral axis and compression sections and having a seamless wrapper of woven metal cloth around said belt.

3. As a new article of manufacture, a belt comprising a hollow member of woven wire seamless cloth having disposed therein superposed layers of rubber composition comprising tension, neutral axis and compression sections.

4. As a new article of manufacture, a belt comprising a hollow member of woven wire seamless cloth having disposed therein superposed layers of rubber composition comprising tension, neutral axis and compression sections, said neutral axis section comprising a plurality of cords laid parallel to each other and along the longitudinal axis of the belt.

5. As a new article of manufacture, a belt of V-construction comprising an outer wrapper of woven metal cloth, superposed layers of rubber composition comprising tension, neutral axis and compression sections, and a thin coating of rubber composition over said outer wrapper of woven metal cloth, said wrapper comprising a seamless preformed sleeve into which said sections as a whole have been inserted.

6. As a new article of manufacture, a belt of V-construction comprising an outer wrapper of woven metal cloth, superposed layers of rubber composition comprising tension, neutral axis and compression sections, and a thin coating of rubber composition over said outer wrapper of woven metal cloth, said neutral axis section comprising a plurality of cords lying parallel to each other and along the longitudinal axis of the belt, said wrapper comprising a seamless preformed sleeve into which said sections as a whole have been inserted.

7. As a new article of manufacture, a rubber belt of V-construction comprising tension, neutral axis and compression sections and having a wrapper of woven metal cloth of preformed seamless sleeve construction into which said sections as a whole have been inserted arranged around said belt, the wires of said wrapper being on a bias with regard to the longitudinal axis of said belt.

MELVIN A. CROSBY.

REFERENCES CITED

The following references are of record in the file of this patent:

UNITED STATES PATENTS

| Number | Name | Date |
|---|---|---|
| 547,788 | Hoffman | Oct. 15, 1895 |
| 2,257,648 | Pierce | Sept. 30, 1941 |
| 2,054,619 | Freedlander | Sept. 15, 1936 |
| 1,970,509 | De Wein et al. | Aug. 14, 1934 |
| 2,158,007 | Ellis | May 9, 1939 |
| 2,016,973 | Pistilli | Oct. 8, 1935 |
| 1,442,924 | Carlisle | Jan. 23, 1923 |
| 398,431 | Midgley | Feb. 26, 1889 |
| 2,199,529 | Shackleford | May 7, 1940 |
| 757,919 | Harley | Apr. 19, 1904 |